United States Patent [19]

Leiber

[11] 4,357,054

[45] Nov. 2, 1982

[54] ANTI-SKID CONTROL SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 268,507

[22] Filed: May 29, 1981

Related U.S. Application Data

[63] Continuation of Ser. No. 39,971, May 14, 1979, abandoned.

[30] Foreign Application Priority Data

May 20, 1978 [DE] Fed. Rep. of Germany ....... 2822143

[51] Int. Cl.³ .............................................. B60T 8/02
[52] U.S. Cl. ........................................ 303/10; 303/92; 303/114; 303/116
[58] Field of Search ............... 303/3, 10, 11, 113–119, 303/100, DIG. 1, DIG. 2, 92, 91, 61, 63; 188/151 A, 1.11, 181

[56] References Cited

U.S. PATENT DOCUMENTS

| 2,800,370 | 7/1957 | Whitney | 303/92 |
| 3,708,214 | 1/1973 | Riordan et al. | 303/115 |
| 3,929,380 | 12/1975 | Leiber | 303/119 |
| 4,013,324 | 3/1977 | Quon | 303/92 |

FOREIGN PATENT DOCUMENTS 1961039 6/1971 Fed. Rep. of Germany ... 303/DIG. 1

Primary Examiner—Douglas C. Butler
Attorney, Agent, or Firm—Edwin E. Greigg

[57] ABSTRACT

An anti-skid system in which a low-pressure sensor generates a signal when the primary brake fluid pressure falls below a minimum level. In that case, the low-pressure signal is applied to the anti-skid brake action controller to diminish the frequency of actuation of the brakes so as to conserve brake fluid. In a variant of the invention, the low-pressure signal is used to temporarily cancel the action of the anti-skid system to conserve brake fluid.

9 Claims, 5 Drawing Figures

ANTI-SKID CONTROL SYSTEM

This is a continuation of application Ser. No. 39,971, filed May 14, 1979, now abandoned.

FIELD OF THE INVENTION

The invention relates to anti-skid control systems for motor vehicles. More particularly, the invention relates to an anti-skid system associated with the brakes of a vehicle in which a pump generates braking pressure that is stored in a fluid reservoir. Associated with the braking system is a set of sensors which determine the motion of the wheels and a processor which transmits the sensor signals into brake control signals. The brake control signals are used to change the braking pressure, for example by altering the control frequency.

BACKGROUND OF THE INVENTION

Anti-skid systems of this type are known, for example from the German Offenlegungsschrift No. 24 60 904 and OS No. 25 43 178. In the former publication, the control frequency of an anti-skid system is altered by varying the ratios of pressure build-up times with different pressure gradients and also possibly by changing the pressure maintenance times in dependence on the pressure increase in a previous cycle. The second publication, OS No. 24 43 178, relates to a supervisory system for an anti-skid system in which two brake pressure control systems are joined whenever one of them has been found to be active for too long a period of time. This system requires additional switches and controls so as to permit a partial or complete inactivation of the control system by suppression of its output signals whenever certain conditions occur.

The anti-skid systems described in the aforementioned publications do not absolutely require the use of braking systems which include pumps and storage chambers but these are well within the scope of the systems described there.

In known braking systems, whether hydraulic or pneumatic, it may happen that when the anti-skid system is required to respond to a highly irregular road surface, the consumption of brake fluid in the anti-skid system is so great that the pump is unable to supply a sufficient amount. If the pump has a diminished volume for other reasons or exhibits a defect of some kind coupled with a possible extremely low external temperature, the primary braking action may be detrimentally affected.

OBJECT AND SUMMARY OF THE INVENTION

It is thus a principal object of the present invention to provide an anti-skid system for a brake installation of the above-described type which maintains the anti-skid control as long as possible even if detrimental conditions obtain, but which includes the provision of never permitting the primary brake system to become inoperative due to excessive use of the anti-skid controller.

These and other objects are attained according to the invention by providing a pressure sensor which generates a signal that is related to the fluid pressure in the storage chamber and which is used to diminish the frequency of anti-skid control action when the fluid pressure in the reservoir is found to decrease.

Accordingly, a reduction in the primary braking pressure changes the frequency of actuation of the anti-skid system and hence reduces the consumption of fluid.

Preferably, the object is attained by prolonging the pressure build-up phase of the anti-skid control cycle. The prolongation of the pressure build-up phase can take place directly in dependence on the pressure measured by the sensor but it may be preferable in practice to provide a pressure switch which responds at a certain minimum pressure and then generates a signal which is used to change the control frequency. The prolongation of the pressure build-up phase may be obtained by changing the pressure gradient, for example by switching a throttle into the brake circuit or else by activating a pulse generator whose signals are used to cycle the inlet pressure valve. In many cases, the brake pressure is admitted by periodic actuation of valves so that the additional increase of the build-up phase may be obtained by altering the duty cycle of the pulse generator in the sense of diminishing the pressure build-up gradient. The control frequency may also be changed by inserting a pressure maintenance period into the pressure build-up cycle, either instead of or in addition to changing the pressure build-up gradient.

It is further possible either instead of or in addition to the steps described above to change the control frequency, by shutting it off partially or altogether for a period of time. The anti-skid system will normally be shut off partially if the primary brake pressure falls below a given level for a given length of time. If the pressure is lower than that level when braking is initiated, it is best not to have the control system respond at all. In another embodiment of the invention, switching means are provided which prevent the activation of the anti-skid control system if the brake pressure is too low at the onset of braking. This shut-off may become effective only with respect to one set of wheels, for example the front wheels. The shut-off may be terminated if the pressure signal again indicates sufficient braking pressure. If the vehicle is equipped with more than one braking circuit, each having a pump and a reservoir, then each of these systems or circuits will advantageously have its own pressure sensor which is then used to control the part of the anti-skid system associated with that brake circuit. In any case, if the pressure builds up again during the aforementioned processes, the previously initiated control frequency change may be made ineffective, at least partially.

The invention will be better understood as well as further objects and advantages thereof become more apparent from the ensuing detailed description of a number of embodiments taken in conjunction with the drawing.

DESCRIPTION OF THE PREFERRED EMBODIMENTS

Figure 1:
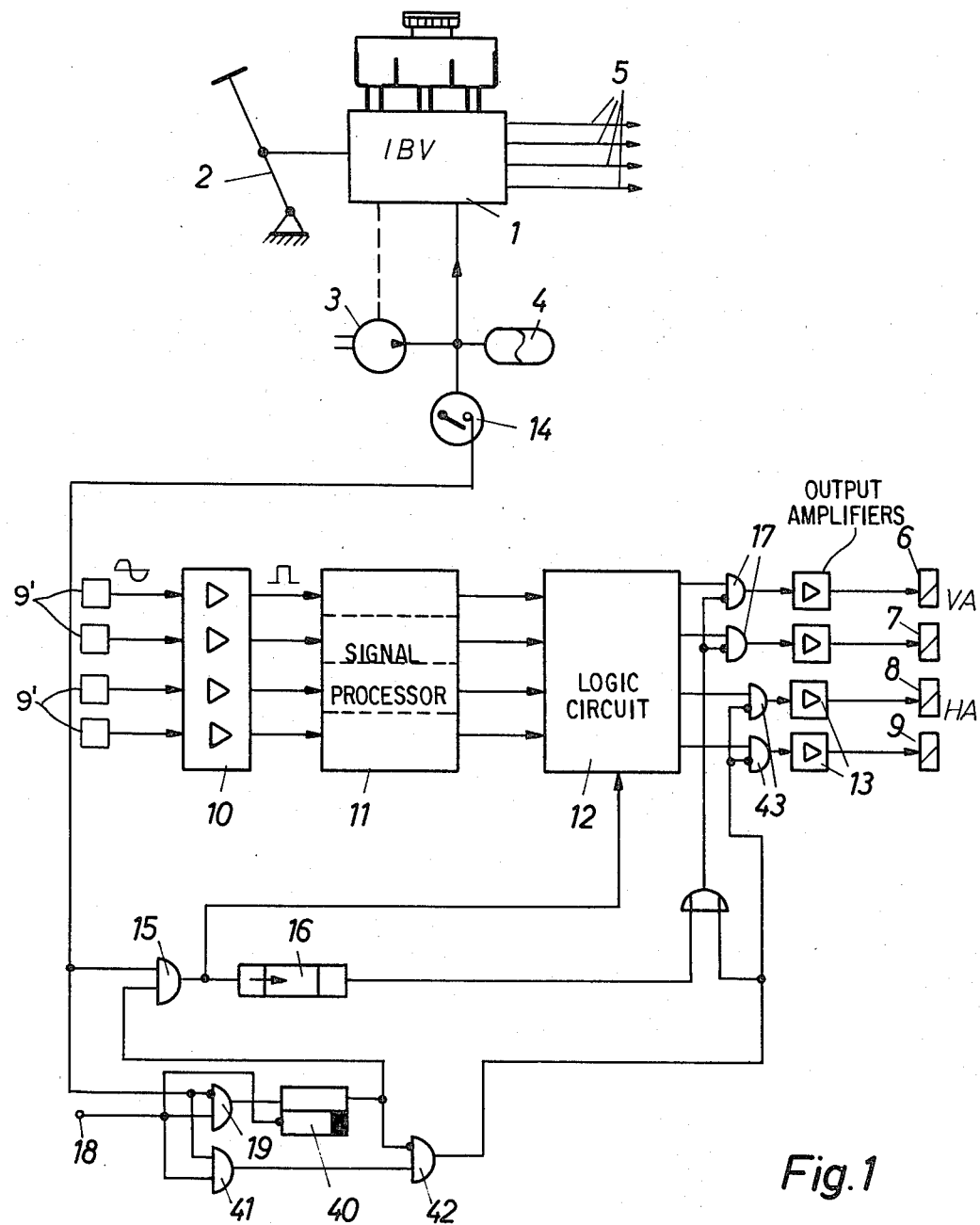
FIG. 1 is an overall diagram of an anti-skid system according to the invention in association with a braking system of a vehicle.

Turning now to FIG. 1, there will be seen illustrated an integrated brake force amplifier 1 actuated by a brake pedal 2 and associated with a brake fluid pressure pump 3 and a fluid pressure reservoir 4. Four brake lines 5 are seen to emerge from the brake force amplifier 1 and would normally lead to the wheel brakes, not shown, of the vehicle. Placed in the brake lines 5 would be valve assemblies 6–9. Each of these valve assemblies may be for example a three-port, two-position valve, two-port, two-position valves (an inlet valve and an outlet valve), a single three-port, three-position valve or one of these valves with an associatable throttle.

The valve assemblies 6–9 are actuated by a pressure variation processor which receives signals from the wheel sensors 91 via input amplifiers 10 and passes these signals through a signal processor 11 and a logical circuit 12 to the output amplifiers 13 which finally activate the valve assemblies 6–9.

According to the present invention, the pressure generator 3,4 has attached to it a pressure sensing switch 14. It is the function of the switch 14 to generate an electrical signal when the pressure at the line leading from the pressure reservoir 4 falls below a certain level. The signal from the switch 14 is applied to one input of an AND gate 15 whose output is fed to an input of the aforementioned logical circuit 12.

Figure 2:
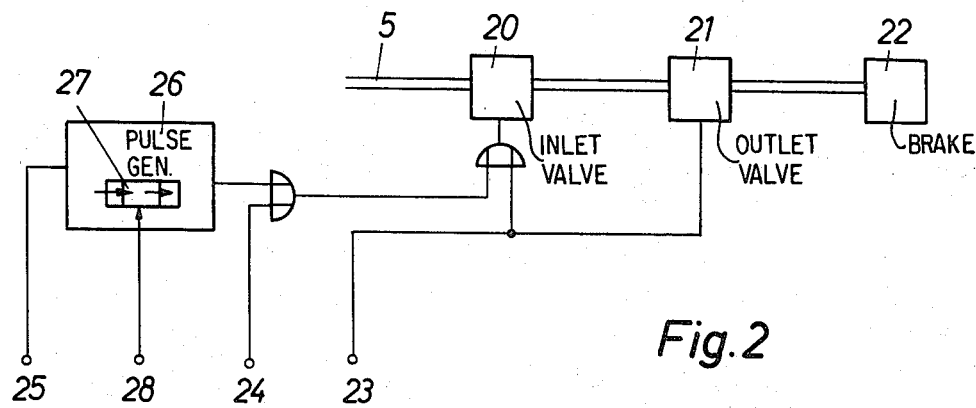
FIG. 2 is one embodiment of the details of the anti-skid control system according to the invention.
Figure 4:
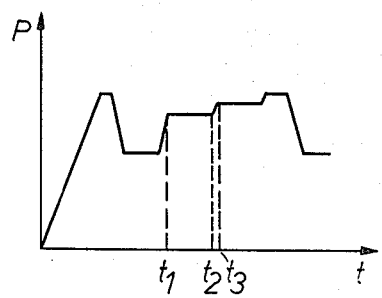
FIG. 4 is a pressure time diagram relating to the embodiment of FIG. 2.

The manner in which the signal from the pressure switch 14 may be used to alter the anti-skid control frequency is illustrated in two embodiments, one of which is shown in FIG. 2. The circuitry of FIG. 2 is connected with control signals provided by the logical circuit 12 for altering the pressure on the brakes through the use of control valves 20 and 21 which are added in the line 5. In FIG. 2 it should be assumed that each of the pressure lines 5 of FIG. 1 leading to the wheel brake 22 includes an inlet valve 20 and an outlet valve 21. By applying the output signals of the logical circuit 12 to contacts 23–25, the pressure may be changed in various ways. For example, if a signal is applied at the contact 23, the pressure is decreased. If the signal is applied at the contact 24, the pressure is held constant. If no signal is applied, the pressure is rapidly increased while a signal at the contact 25 causes an actuation of the pulse generator 26 which results in a slow pressure increase. If the pressure switch 14 generates an output signal, that signal passes through the AND gate 15 to the logical circuit 12 which passes it at contact 28 to the pulse generator 26 for the purpose of changing one or two time constants so as to decelerate the rate of pressure increase by means of the timing circuit 27. The timing diagram for this event is illustrated in FIG. 4. After a first pressure increase, the time constant is switched at the time $t_1$. The pressure maintenance phase ($t_1$–$t_2$) is increased and the period of pressure increase ($t_2$–$t_3$) is decreased. The result is an average reduction of the gradient of pressure increase.

Figure 3:
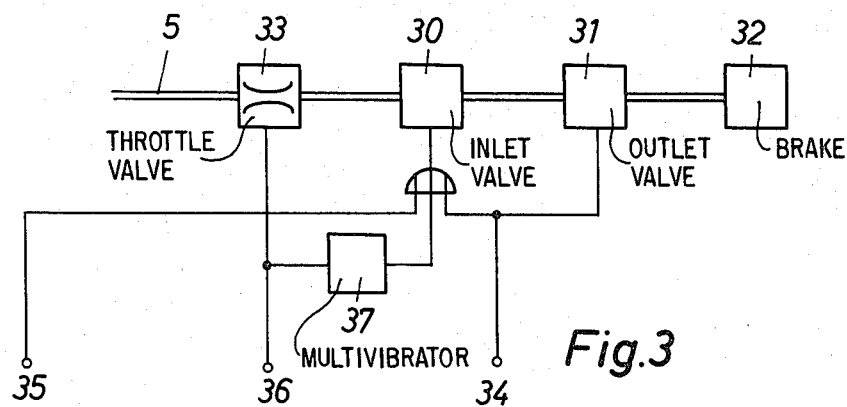
FIG. 3 is a second embodiment of the anti-skid system according to the invention.
Figure 5:
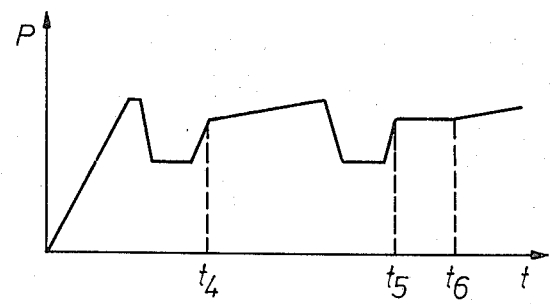
FIG. 5 is a pressure time diagram relating to the embodiment of FIG. 3.

The second embodiment illustrated in FIG. 3 sets forth a different control circuit that is connected to output signals from the logical circuit 12 for altering the pressure on the brakes through the use of throttle valve 33 and control valves 30 and 31 which are added in pressure line 5 to the brakes. In this embodiment, a signal at the contact 34 diminishes the pressure while a signal on the contact 35 keeps the pressure constant. If the pressure switch 14 applies a signal to the contact 36, the throttle valve causes a diminished pressure build-up as illustrated in FIG. 5 beginning with the point $t_4$.

The embodiment of FIG. 3 also permits the low pressure signal to be applied to a monostable multivibrator 37. This signal causes the switchover of the multivibrator into its unstable state for a predetermined period of time during which the pressure is maintained at constant level prior to a slow build-up. These events are illustrated in FIG. 5 at the time $t_5$ and $t_6$, the difference between these two times being the unstable time constant of the multivibrator.

The system illustrated in FIG. 1 also includes circuitry for shutting off the anti-skid control when certain conditions occur. In order to permit this shutoff, the output signal from the AND gate 15 is also applied to an input of a timing member 16, which generates an output signal if its input signal, i.e., the signal received from the pressure switch 14, persists beyond a predetermined time, for example eight seconds, and then blocks the actuation of the valve assembly 6 and 7 due to its influence on the AND gate 17. The contact 18 carries a signal as soon as the brakes are actuated. If at that time the pressure switch 14 does not produce a signal, the AND gate 19 sets the bistable flip-flop 40 which then so prepares the AND gate 15 that the events can take place in the manner described above if a signal from the pressure switch 14 should then occur. At the end of the braking process, the bistable flip-flop 40 is reset into its original state.

However, if the pressure switch signal is already present when the brakes are applied, i.e., when the signal at the contact 18 occurs, i.e., if the braking pressure is already too low when the brakes are applied, the AND gate 41 is opened and passes a signal through the AND gate 42 to the AND gates 17 and 43, thereby causing the total blockage of the anti-skid control system. If the pressure of the pressure generating assembly 3, 4 increases at any time, the blockage is cancelled and the anti-skid control is able to function as usual.

The foregoing relates to preferred exemplary embodiments of the invention, it being understood, however, that other embodiments and variants thereof are possible within the spirit and scope of the invention.

What is claimed and desired to be secured by Letters Patent of the United States is:

1. An anti-skid braking system for a wheeled vehicle, including a brake fluid pump and a brake fluid pressure reservoir, sensors for generating wheel signals related to wheel motion, and a brake pressure controller for receiving said wheel signals and for controlling anti-skid braking pressure applied to said wheels during a skid; wherein the improvement comprises a brake fluid pressure sensor for sensing the pressure of said brake fluid in said pressure reservoir and for controlling an electrical signal due to low brake fluid pressure in said reservoir which is applied to said brake pressure controller; circuit means for effecting at least partial cancelling of said anti-skid braking action when said pressure sensor delivers an electrical signal after a predetermined period of time; said circuit means including a timing member which generates an electrical signal after a predetermined time to block actuation of a portion of said anti-skid braking pressure whereby, when said fluid pressure in said reservoir decreases, the anti-skid action by said pressure controller is at least partially cancelled.

2. An anti-skid system according to claim 1, wherein said pressure controller includes means for changing the gradient of pressure build-up for the purpose of altering the frequency of brake actuation.

3. An anti-skid system according to claim 2, further comprising a throttle disposed in the brake line for altering the gradient of pressure build-up.

4. An anti-skid system according to claim 2, further comprising means for pulsed actuation of an inlet pressure valve.

5. An anti-skid system according to claim 2, further comprising means for changing the duty cycle of actuation of an inlet pressure valve in said brake line for the purpose of changing the pressure build-up gradient.

6. An anti-skid system according to claim 1, including means for maintaining the pressure for a predetermined period of time for the purpose of varying the frequency of brake actuation.

7. An anti-skid system according to claim 1, further comprising circuit means for testing if a low pressure signal from said pressure sensor is present at the initiation of braking action and for cancelling the anti-skid action of said pressure controller when said signal from said pressure sensor is present.

8. An anti-skid system according to claim 1, said system including a plurality of braking circuits each having a pump and a fluid pressure reservoir, and each of said circuits being provided with a separate one of said pressure sensors, the signal from which is applied to the associated portion of said pressure controller.

9. An anti-skid braking system as claimed in claim 1, wherein said circuit means includes electrical control means for total blockage of said anti-skid braking pressure.

* * * * *